(12) United States Patent
Klinger

(10) Patent No.: US 6,174,404 B1
(45) Date of Patent: Jan. 16, 2001

(54) LAMINATED PLASTIC CARDS AND PROCESS AND APPARATUS FOR MAKING THEM

(75) Inventor: Florian Klinger, Yavne (IL)

(73) Assignee: Supercom Ltd, Kfar Saba (IL)

(*) Notice: Under 35 U.S.C. 154(b), the term of this patent shall be extended for 0 days.

(21) Appl. No.: 08/397,960

(22) Filed: Mar. 3, 1995

(30) Foreign Application Priority Data

Oct. 27, 1994 (IL) .......................................... 111428

(51) Int. Cl.$^7$ .......................... B32B 31/00; B41M 31/00; B44C 1/165

(52) U.S. Cl. ....................... 156/277; 165/240; 165/273.1; 165/272.2

(58) Field of Search ................................... 156/277, 240, 156/273.1, 272.2

(56) References Cited

U.S. PATENT DOCUMENTS

| | | | |
|---|---|---|---|
| Re. 32,056 | * 12/1985 | Granzow et al. ............... | 141/1 |
| 3,013,878 | 12/1961 | Dessauer . | |
| 3,068,140 | * 12/1962 | Biddle .......................... | 156/277 |
| 3,444,732 | * 5/1969 | Robbins et al. ............... | 73/150 |
| 3,811,828 | * 5/1974 | Ohta et al. .................... | 432/227 |
| 3,826,701 | * 7/1974 | Miller ........................... | 156/64 |
| 3,925,139 | * 12/1975 | Simmons ....................... | 156/358 |
| 4,389,438 | * 6/1983 | Ohtsuki et al. ............... | 428/35 |
| 4,560,426 | 12/1985 | Moraw et al. . | |
| 4,687,526 | 8/1987 | Wilfert . | |
| 4,928,996 | 5/1990 | Oshikoshi et al. . | |
| 4,978,146 | * 12/1990 | Warther et al. ............... | 283/81 |
| 4,992,833 | 2/1991 | Derimiggio . | |
| 5,211,424 | 5/1993 | Bliss . | |
| 5,261,987 | 11/1993 | Luening et al. . | |
| 5,306,381 | 4/1994 | Nakazawa et al. . | |
| 5,532,724 | 7/1996 | Inagaki et al. . | |

FOREIGN PATENT DOCUMENTS

| | | |
|---|---|---|
| 2267058A | 11/1993 | (GB) . |
| 2273466 | 6/1994 | (GB) . |
| 2281535 | 3/1995 | (GB) . |
| 61-295578 | 12/1986 | (JP) . |
| 9312940 | 7/1993 | (WO) . |
| 9506567 | 3/1995 | (WO) . |

OTHER PUBLICATIONS

International Publication No. WO 90/05640.
International Publication No. WO 93/25391.
International Publication No. WO 94/03333.
International Search Report (Form PCT/ISA/210) and Notification thereof (PCT/ISA/220) for PCT application PCT/US95/13860.

* cited by examiner

Primary Examiner—Richard Crispino
Assistant Examiner—J. A. Lorengo
(74) Attorney, Agent, or Firm—Pitney, Hardin, Kipp & Szuch, LLP

(57) ABSTRACT

A method and apparatus for producing laminated plastic cards, which carry printed matter protected by an overlying layer of transparent plastic material. The picture is formed by conventional laser printing means on a substrate constituted by a plastic material that is sensitive to the combined application of heat and pressure, but is only partially set by radiant heat; thereafter a transparent coating film or sheet is juxtaposed to the printed face of the substrate, and optionally another such film is juxtaposed to its rear face, and the substrate is bound to the film or films by the application of pressure and heat to bind them together.

14 Claims, 5 Drawing Sheets

LAMINATED PLASTIC CARDS AND PROCESS AND APPARATUS FOR MAKING THEM

FIELD OF THE INVENTION

The invention relates to a method and apparatus for producing laminated plastic cards, in particular cards which carry printed matter which is protected by an overlying layer of transparent plastic material.

BACKGROUND OF THE INVENTION

Plastic cards, which carry printed matter such as words, designs, pictures or other printed information on a plastic backing, are widely used for all means of commercial purposes, personal identification, visiting cards and the like. It would be highly desirable to print all such cards by means of laser printers, but this is not always possible in the present state of the art, for the following reasons.

Laser printing machines are known in the art and are widely used for a variety of purposes. Basically, the laser printing process comprises, as a first step, defining the subject matter to be printed in the form of an array of instructions that can be used to control the printing machine. A common way of doing this consists in scanning the subject matter to be printed and registering the results of the scanning in a processor's memory, in the form of an array of digital instructions. Said instructions control the emission of laser rays from a laser source. The laser beams impinge on a cylinder in a pattern controlled by the said instructions and electrostatically charge the surface of said metal cylinder at selectively predetermined spots. The selectively electrostatically charged cylinder passes in the vicinity of a reservoir of coloring matter in powder form. The coloring matter particles are attracted to the aforesaid selectively charged spots of said cylinder and form thereon a desired pattern. A print substrate is then passed into contact with the metal cylinder and the pattern formed by the color particles is deposited thereon. This operation is repeated for each color if a multicolor print is desired, usually four times to provide the basic colors magenta, cyan and yellow plus black, to produce a complete colored image. At this stage a colored image has been formed on the print substrate. In order to stabilize the image, the print substrate is passed between heated rollers, which fix or set the print so that it is permanent and stable.

However, the aforesaid process, while quite effective for a number of applications, cannot be satisfactorily applied for the production of cards which are made of materials sensitive to the combined application of pressure and heat, to which they are subjected in the setting section of laser printers. Hereinafter, these material will be generically referred to as "thermo-mechanically sensitive materials" or "thermo-mechanically sensitive (printing) substrates". Among such thermo-mechanically sensitive materials or printing substrates are synthetic printing sheets, which, when printed upon and set in conventional laser printers, become damaged to such an extent that they cannot be used at all. If an attempt is made to render the setting conditions of laser printers less severe, in order not to damage the plastic card backing, then the setting is insufficient, the print is not stable, and once again the card is not satisfactorily usable. An example of such synthetic printing sheets are those marketed under the trade mark Teslin® by PPG industries, Inc., Pittsburgh Pa. Teslin® is described as a single layer, highly filed, microporous plastic film, based on polyolefin material and containing about 60% by weight of silica, available in gauges ranging from 7 Mil up to 18 Mil. Its properties have been described by the manufacturer and are known to persons skilled in the art.

It is a purpose of this invention to overcome the difficulties met in laser printing thermo-mechanically sensitive materials, and to produce printed cards having a backing of said materials, which are fully satisfactory and of perfect quality.

It is another purpose to provide laser printed, multilayer cards which are mechanically extremely strong and cannot be separated mechanically, viz. without the application of solvents or heat into the layers of which they are composed.

It is a further purpose to provide such cards which can be printed, and if desired laser printed, on both sides.

It is a still further purpose to provide such multilayer cards that are made of highly pliable sheets and yet are relatively stiff and suitable for uses in which stiffness is a factor.

It is a still further purpose to provide such multilayer cards that are printed, if desired, over their entire area, without blank borders.

It is a still further purpose to provide a method for achieving all the preceding purposes and others that will appear as the description proceeds.

It is a still further purpose to provide an apparatus for achieving the aforesaid results, which apparatus is simple and not expensive to make, nor difficult to use.

Other purposes and advantages of the invention will appear as the description proceeds.

SUMMARY OF THE INVENTION

In this application, the term "substrate" or "print substrate" means any backing on the which printing can be effected, regardless of its form and composition, though particular reference will be made to thermo-mechanically sensitive substrates, as hereinbefore defined. In case of doubt; a simple test will permit to determine whether a given substrate is thermo-mechanically sensitive, in the sense in which this expression is used in the present application. It suffices to pass the substrate between two rollers, heated to minimum 120° C. and pressed against one another with a pressure of minimum 150 Kg. If this operation significantly affects the substrate, as to its physical properties or appearance or other properties relevant to its function as a print substrate, it should be classified as "thermo-mechanically sensitive".

The terms "picture" or "subject matter" or "graphic subject matter" synonimously indicate any kind of printable or printed subject matter, and therefore comprise, among other things, pictures representing persons or objects, portraits, photographs, letters, words, signs and any figures or images that may be carried by a substrate.

The method according to the invention comprises the following steps:

1—providing a set of digital instructions, such as a computer file, which defines the subject matter to be printed on a card made of a thermo-mechanically sensitive material, which subject matter will be called, for brevity's sake, "picture";

2—depositing, by conventional laser printer operations, said picture on a substrate made of the aforesaid material;

3—partially setting said picture by radiant heat;

4—juxtaposing to the printed substrate a face transparent coating film or sheet on the printed face and, optionally and preferably, a back coating film or sheet on the rear face of the card; and 4—applying pressure and heat, by lamination or otherwise, to the juxtaposed printed substrate and face coating film or sheet and, if any, back coating film or sheet, to bind them together.

Thereafter, if needed, the card is cut to the desired size, e.g. by means of an electric die cutter.

In a variant of the invention, it is possible to provide the coating film or films with a layer of cold adhesive on the face or faces thereof that will be adjacent to the substrate, and in that case the substrate and coating films will be bonded together by the application of pressure only. In another variant a layer of cold glue or a thermoplastic layer, e.g. of polyethylene, can be applied to the substrate to bind thereto another substrate layer. The coating films are preferably made of a thermoplastic, synthetic material, such as, polyethylene or a polyester.

It has been found that the heat-setting by radiant or IR heat, hereinafter called "provisional setting", partially but sufficiently stabilizes the picture, so that all subsequent operations of the method according to the invention can be carried out without difficulty, not damaging—and indeed surprisingly improving, as will be explained hereinafter—the print substrate. On the other hand, when the final setting by pressure and heat is carried out, the picture is finally and completely set, and at the same time the substrate and the coating or coatings are laminated together so that they form a single body, that cannot be separated into its component layers. When microporous, thermo-mechanically sensitive substrates, such as Teslin®, are used, the coating films bond directly with it, as the porous nature of the substrate allows for penetration of the coating films into its structure to form very strong anchor points. Adhesives also bond to the substrate in like manner, and this property is important in an embodiment that will be described hereinafter. It was unexpected and surprising that the same operation which irreparably damages the substrate when it is carried out on conventional laser printers, improves its qualities when it is carried out according to the invention, at a later stage and after a first temporary setting.

Since the final card cannot be separated into its constituent layers, it can be printed over its entire area. This is generally not possible with the prior art cards, which are provided with blank borders, to permit firm bonding of their various layers, since a bonding over their printed area is difficult to effect because of the porous characteristics of the substrate The resulting card, having the aforesaid properties, is therefore an aspect of the invention.

The back of the card may be unprinted, or it may have been previously printed otherwise than by means of a laser printer. However, cards that are laser printed on both faces can be produced by an embodiment of the invention, which comprises making two laser printed substrates, or a larger even number of such substrates, as will be explained hereinafter, juxtaposing them back-to-back with a layer of adhesive matter therebetween, juxtaposing two face coating films on the two faces of the resulting multilayer structure, bonding the layers thereof together and trimming the resulting card to size, thus cutting off their joining edges. This embodiment of the invention has several variants, depending on the choice of the adhesive matter. If it is cold glue, the face layers must also have a cold glue applied to their inner faces to bind them to the two substrates, in the final stage the multilayer structure is simply compressed to bind all the layers thereof together. If the adhesive matter is a thermoplastic polymer, generally in sheet form, such as polyethylene, P.V.C or a polyester, the face coating films will be of the same or like matter and the bonding operation will require the application of heat and may be a hot lamination or a hot compression The apparatus for carrying out the invention comprises two components, which may and often will not be structurally connected. The first component is a laser printer, which is characterized in that the substrate used, carrying the subject matter not yet heat-set, is passed through a heat-setting section in which the picture is provisionally heat-set without the application of pressure, preferably by the application of radiant heat or dielectric or microwave heating, but otherwise may be any type of known laser printer. The second component is a pressure and heat-setting apparatus for bonding together by the application of pressure and heat, e.g. by hot lamination or hot compression, the printed substrate and a face coating film and preferably a back coating film as well, which are fed thereto, or, in an embodiment of the invention, two substrates, two coating films and one or more adhesive matter layers or thermoplastic bonding layer, such as a layer of polyethylene or PVC; and may comprise, e.g., means for passing heated rollers under pressure on the juxtaposed printed substrate and face coating film, and preferably, back coating film or pair of cards juxtaposed back-to-back or to subject the same to heat and compression.

DETAILED DESCRIPTION OF PREFERRED EMBODIMENTS

Figure 1:
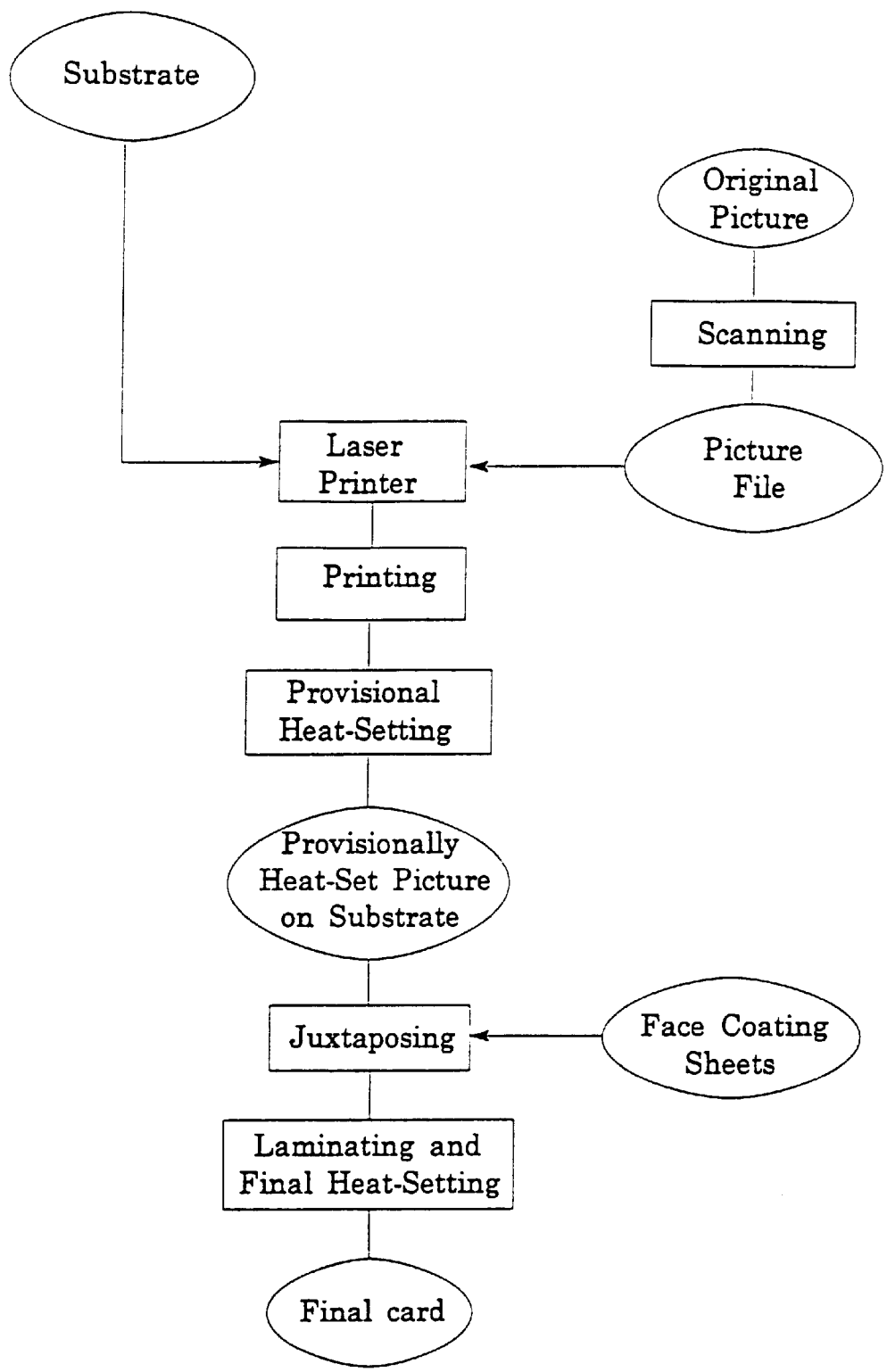
FIG. 1 is a flow diagram schematizing the method of the invention.

FIG. 1 is a flow diagram representing an embodiment of the method of the invention. The original picture is scanned, by means of a scanner, which is a well known apparatus, and the information provided by the scanner is transferred to a general purpose digital computer or a special purpose processor, wherein it is stored as what may be called "the picture file". Of course, the picture file could be obtained by other means known in the art.

The backing or substrate, made of a thermo-mechanically sensitive material, hereinbefore defined, e.g. Teslin®, is fed to the laser printer and the picture file is used to control the operation of the printer to deposit coloring matter on the picture substrate to form a monocolor or multicolor picture. Any type of laser printer can be used for this purpose and its operation need not be described further, as it is well known and conventional. After the formation of the picture on the substrate, however, the setting is not carried out as in a conventional laser printer, but is carried out by radiant or IR heating, this producing, without the application of pressure, a provisionally heat-set picture.

The printed substrate is then juxtaposed to a transparent sheet, e.g. of polyethylene, Mylar® or saturated polyester, which constitutes the face coating of the final card and, preferably, as in the embodiment described hereinafter, with another sheet, which constitutes the back coating. Desirably, this second sheet is transparent too and is made of the same material as the face sheet; however, it may be different.

The print substrate and the coating film or sheets are then bonded together by application of pressure and heat. While lamination is indicated in the block diagram, other means, e.g. hot compression, could be employed. Lamination can be carried out by supporting the back coating film, if any, or, otherwise, the print substrate, on a hard surface, and passing heated rollers over the face coating film. Alternatively, the juxtaposed face coating film and print substrate, and, if present, the back coating film, can be passed between together heated rollers; or other suitable apparatus can be used, such as a heated press.

Figure 2:
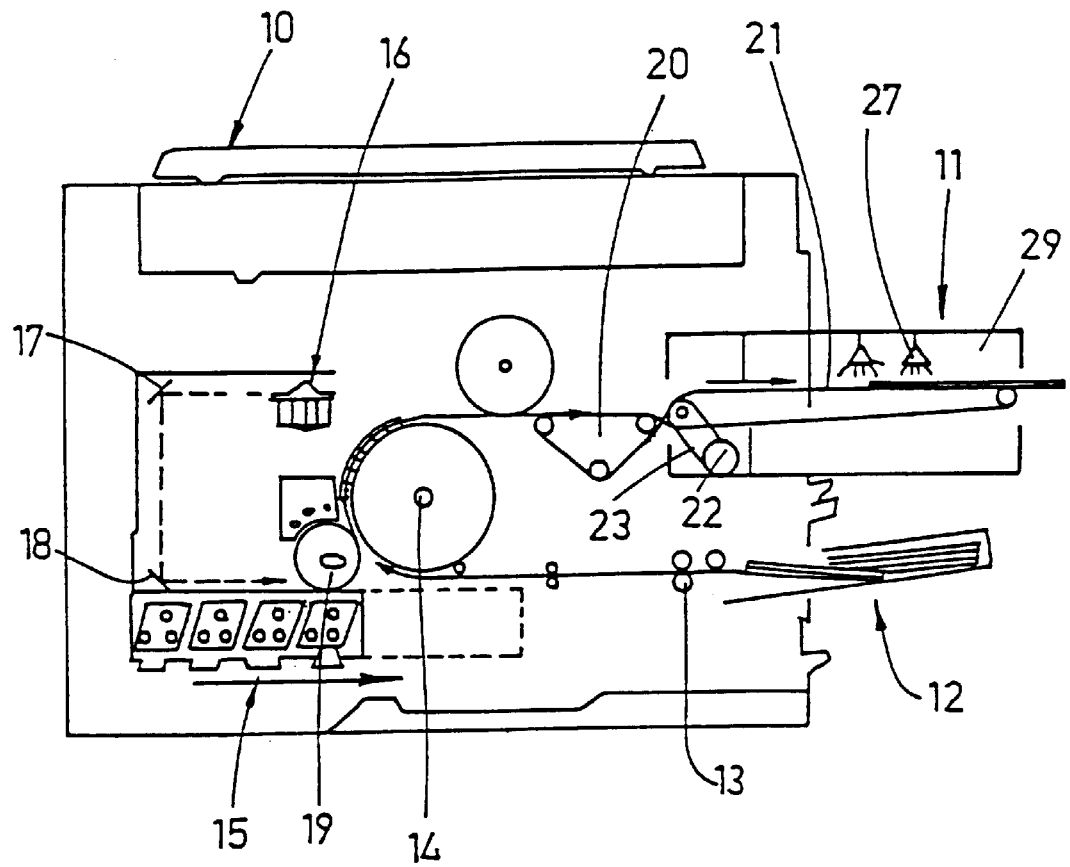
FIG. 2 is a schematic cross-section of the first component of an apparatus according to an embodiment of the invention.

FIG. 2 schematically illustrates a laser printer according to the invention. The laser printer is generally indicated at 10 and may be any conventional laser printer except for the heat-setting portion, which is indicated at 11. The conventional part of the laser printer structure is already understood to persons skilled in the art. It comprises a feed section 12 from which sheets are fed by means of a group of rollers 13 to a drum 14. Printing colors are contained in powder form in containers 15. Four containers are indicated in the drawing, since it is assumed that the printing is multicolor printing and is carried out in the three basic colors, magenta, cyan and yellow, plus black. Conventional means are provided for shifting containers 15 so that each of them may come into contact with drum 14 at the appropriate moments and transfer its coloring matter onto said drum. A laser source, not shown, directs a laser beam, controlled by digital control means, onto an octagonal mirror 16, from which the beam is deviated according to a program and successively reflected by mirrors 17 and 18 to impinge on a drum 19, according to the patterns determined by the reversed picture file and the controlling processor, which is not shown. The colors are captured by drum 19 according to said patterns. Drums 14 and 19 rotate in mutual contact and the reversed picture is transferred to the temporary substrate that has been fed to drum 14. This operation is repeated as many times as is required, depending on the number of colors of the picture. Thereafter, the print substrate, with the picture formed thereon, but not yet set and still in a labile state, passes through belt conveyor 20 to the provisional setting area 11, better illustrated in FIG. 3. All the operations described so far and the apparatus means for carrying them out are conventional and well known to persons skilled in the art. As an example of laser printer which comprises all the elements so far described, one may cite CLC-350 by CANON.

Figure 3:
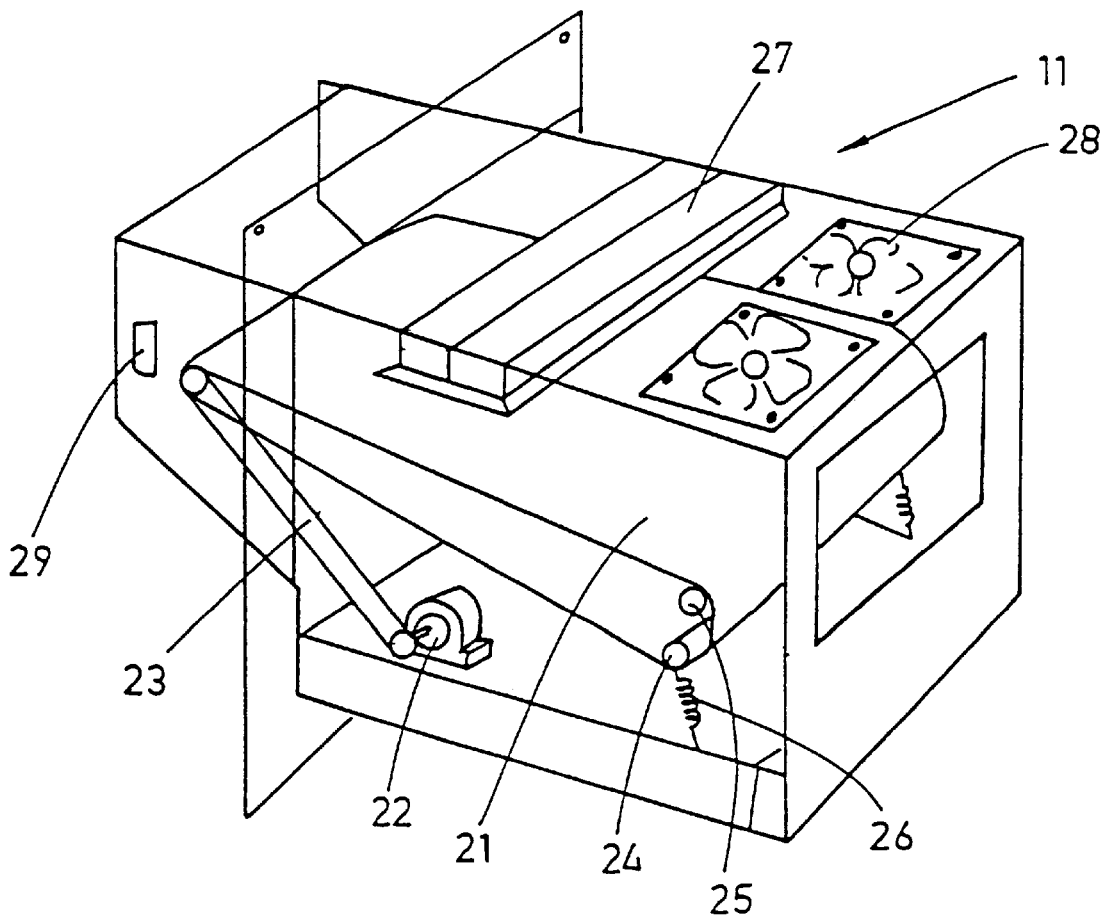
FIG. 3 schematically illustrates, on an enlarged scale, the heat-setting section of the printer, according to an embodiment of the invention.

Refer now to FIG. 3. The setting section 11 comprises a conveyor belt 21 which transports the temporary substrate with the reversed picture, which is driven by a motor 22 through a transmission chain 23, and is guided by rollers 24 and 25, its tension being adjusted by controlling the distance between said rollers by means of a spring 26. Numeral 29 indicates a substrate sensor. Sources of radiant or IR heat 27 effects the provisional heat-setting of the picture. Fans 28 are conveniently provided to aerate the setting section 11, which contains this portion of the machine according to the invention.

Figure 4:
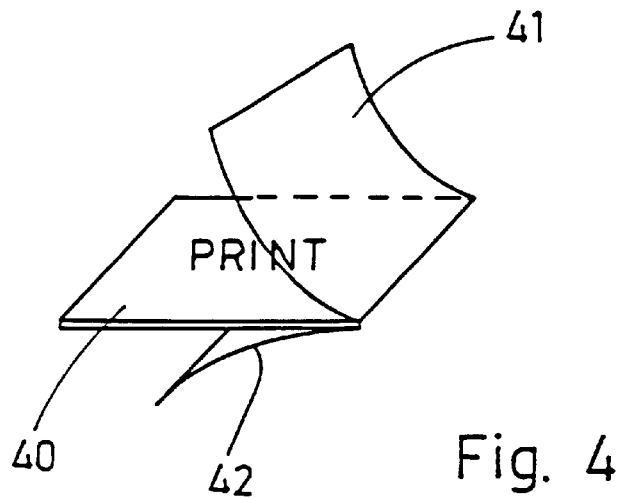
FIG. 4 schematically illustrates the juxtaposition of the printed substrate and face and back coating films.
Figure 5:
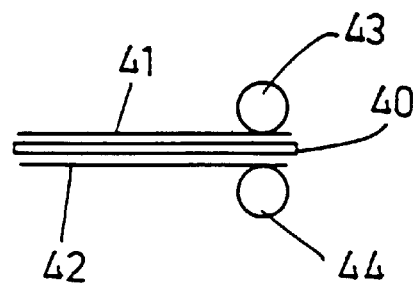
FIG. 5 schematically illustrates a lamination operation, according to an embodiment of the invention.

The print substrate with the provisional heat set picture is discharged from conveyor belt 21 in any convenient way, and then manually passed to the final process stage. Substrate 40 and facing sheets 41–42 are juxtaposed, as schematically shown in perspective view in FIG. 4. The lamination stage follows. In the particular embodiment described, this stage is illustrated in FIG. 5 as being carried out by passing the juxtaposed substrate and a face and a back coating film between heating rollers. The substrate is illustrated at 40, the face coating film at 41, the back coating film at 42, and the pressure and heating rollers are illustrated at 43 and 44. However, as has been said, different apparatus could be used for carrying out this operation.

Figure 6:
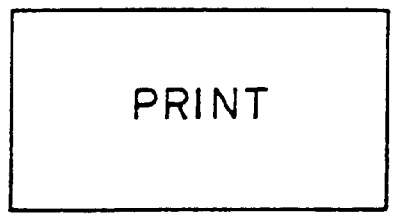
FIG. 6 is a plan view of a card according to the invention.
Figure 7:
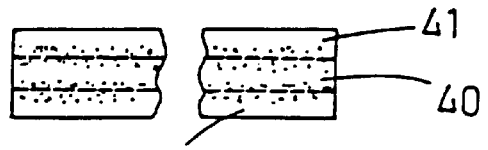
FIG. 7 is a partial cross-section at a greatly enlarged scale of the card of FIG. 6.

The resulting laminated card is illustrated in plan view in FIG. 6 and partially, at a much enlarged scale, in FIG. 7. In FIG. 7 it is schematically illustrated that the material of the coating sheets penetrates into the substrate itself, to form an inseparable unity which is the final card product. Experience teaches that said card is much stiffer and stronger than the sheets of which it is made, which are of softer, pliable material, as indicated hereinbefore. The card, therefore, constitutes a new and valuable product.

Figure 8:
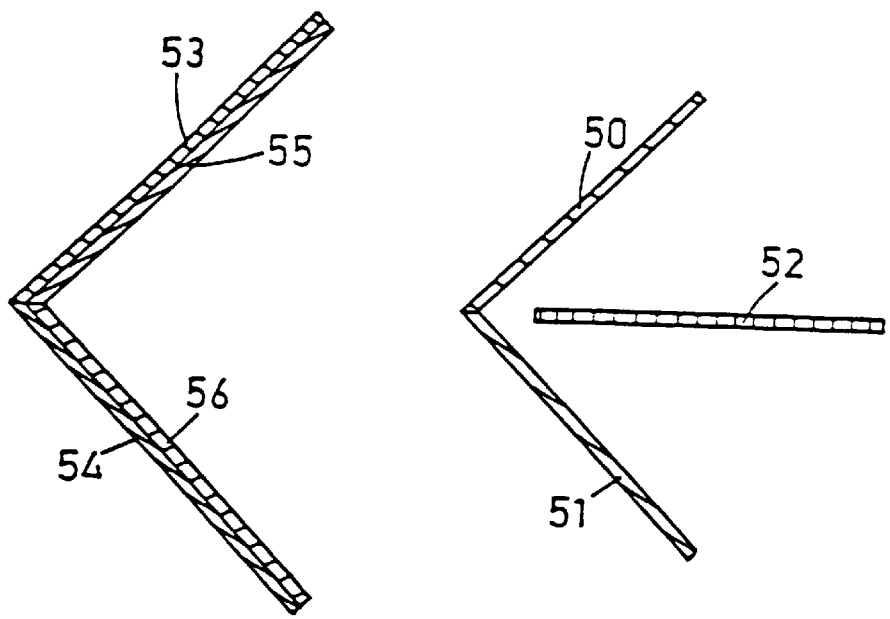
FIGS. 8 and 9 schematically illustrate in cross-sectional view and FIG. 10 schematically illustrates in perspective view an embodiment of the process for making a card that is laser printed on both sides.
Figure 9:
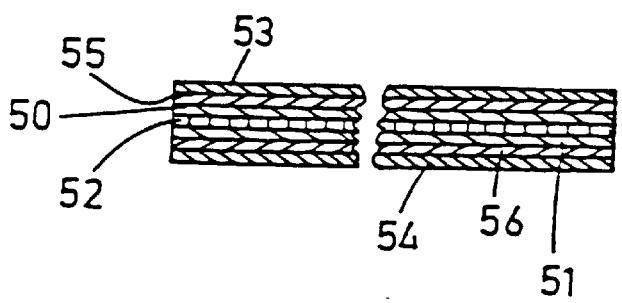
Figure 10:
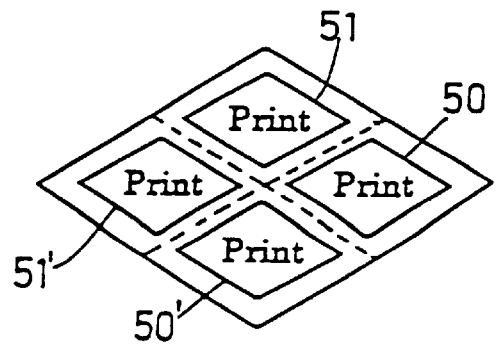

FIGS. 8 and 9 schematically illustrate an embodiment of the invention for the production of a card laser printed on both sides. 50 and 51 are respectively the printed substrates that will constitute the front and the back of the final card. Each substrate could be separately printed, but it is convenient to print two substrates, or a larger even number of substrates together, as single sheet. Thus in FIG. 8 the two substrates 50 and 51 are shown as joined together, and each of them could be double or more. 52 is a cold adhesive layer. If each of them is double, e.g., four substrates 50-50'-51-51' will be joined and printed together, as shown in perspective view in FIG. 10. 53 and 54 respectively are the face and back coating films, which are provided with cold adhesive layers, 55 and 56 respectively. Coating films 53 and 54 are shown as joined together, like the substrates, and each of them too could be double or more. FIG. 8 separately shows the substrates with their adhesive layers, the coating films and the adhesive layer 52. All the said layers are juxtaposed to form a multilayer or "sandwich" structure. Pressure is then applied to bond the layers together and the resulting structure is trimmed to the desired size, thus cutting off the edges at which the substrates and coating films are joined together and separating each substrate and cooperating layers from the others. A card resulting from these operations is shown in fragmentary, greatly enlarged, cross-section, in FIG. 9. In place of cold adhesive layer 52, a thermoplastic sheet (e.g. of polyethylene or PVC) could be used and the expression "adhesive layer", without further specification, should be construed to include both a cold adhesive layer and a thermoplastic film. If a thermoplastic film is used as bonding means, adhesive layers 55 and 56 will not be required and the bonding operation will be a hot lamination or a hot compression, and then trimmed (e.g., by a cutter) to the desired size.

While some embodiments of the invention have been described by way of illustration, it will be apparent that the invention may be carried out by persons skilled in the art with many modifications, variations and adaptations, without departing from its spirit or exceeding the scope of the claims.

What is claimed is:

1. Process for the production of laminated plastic cards, comprising a thermo-mechanically sensitive substrate having a graphic subject matter printed thereon, which comprises;

(1) providing a set of digital instructions, which defines the graphic subject matter;
(2) depositing, by conventional laser printer operations, printing colors on said thermo-mechanically sensitive plastic substrate to form said graphic subject matter;
(3) only partially setting said graphic subject matter by radiant heat;
(4) juxtaposing to said substrate, carrying said graphic subject matter, at least a coating film on the printed face thereof; and
(5) bonding said substrate and said face coating film.

2. Process according to claim 1, further comprising juxtaposing to the substrate an additional transparent plastic sheet on the rear face thereof and bonding said additional transparent plastic sheet together with the substrate and the face coating film.

3. Process according to claim 1, wherein the bonding is carried out by the application of pressure and heat.

4. Process according to claim 3, wherein the application of pressure and heat is effected by hot lamination between heated rollers.

5. Process according to claim 3, wherein the application of pressure and heat is effected by hot compression.

6. Process according to claim 1, further comprising cutting the bonded substrate and coating films to the desired card size.

7. Process according to claim 1, wherein the thermo-mechanically sensitive substrate is a plastic substrate.

8. Process according to claim 1, wherein the thermo-mechanically sensitive substrate is a Teslin® printing sheet.

9. Process according to claim 1, wherein the coating films are made of a thermoplastic synthetic material.

10. Process according to claim 9, wherein the thermoplastic synthetic material is chosen from among polyethylene or a polyester.

11. Process according to claim 1 for the production of laminated plastic cards laser printed on both faces, comprising carrying out steps 1, 2 and 3 of claim 1 on an even number of substrates, juxtaposing the same back-to-back with the interposition of a layer of adhesive matter, juxtaposing to the resulting structure a face coating and a back coating layer, and then bonding all the juxtaposed layers together.

12. Process according to claim 11, wherein the adhesive matter is a cold glue, wherein layers of cold glue are provided between the face coating and the back coating layer and the adjacent printed substrates, and the bonding of the layers together is carried out by the application of pressure.

13. Process according to claim 11, wherein the adhesive matter is a thermoplastic film, and the bonding of the layers together is carried out by the application of heat and pressure.

14. Process according to claim 1, wherein a PVC sheet is used as a bonding means.

\* \* \* \* \*